United States Patent [19]

Thorn

[11] Patent Number: 4,813,990

[45] Date of Patent: Mar. 21, 1989

[54] METHOD OF MAKING A BEVELLED GLASS ASSEMBLY

[75] Inventor: John E. Thorn, Sylvania, Ohio

[73] Assignee: Therma-Tru Corp., Toledo, Ohio

[21] Appl. No.: 197,339

[22] Filed: May 23, 1988

Related U.S. Application Data

[62] Division of Ser. No. 75,401, Jul. 20, 1987, Pat. No. 4,814,213.

[51] Int. Cl.[4] .............. C03B 23/02

[52] U.S. Cl. .............. 65/105; 65/62; 65/112; 52/311; 52/314; 52/315; 52/656

[58] Field of Search .............. 65/62, 105, 112; 52/311, 314, 315, 656

[56] References Cited

U.S. PATENT DOCUMENTS

D. 131,814 3/1942 Larson .............. 52/316
2,618,819 11/1952 Goodwillie .............. 20/56.5
3,281,227 10/1966 Leflet, Jr. et al. .............. 65/62
3,859,407 1/1975 Blanding et al. .............. 65/62
3,935,351 1/1976 Franz .............. 428/34
4,488,919 12/1984 Butler .............. 156/153
4,495,739 1/1985 Drennan .............. 52/308
4,518,446 5/1985 Drennan .............. 156/63

*Primary Examiner*—Arthur Kellogg
*Attorney, Agent, or Firm*—Emch, Schaffer, Schaub & Porcello Co.

[57] ABSTRACT

A bevelled glass assembly and method of making is disclosed. A sheet of annealed glass has at least one groove ground on one surface. At least one other groove intersects the first groove. Both grooves define an array of parallel striations. The sheet of glass is then tempered. The sheet of glass is normally surrounded by a frame.

4 Claims, 2 Drawing Sheets

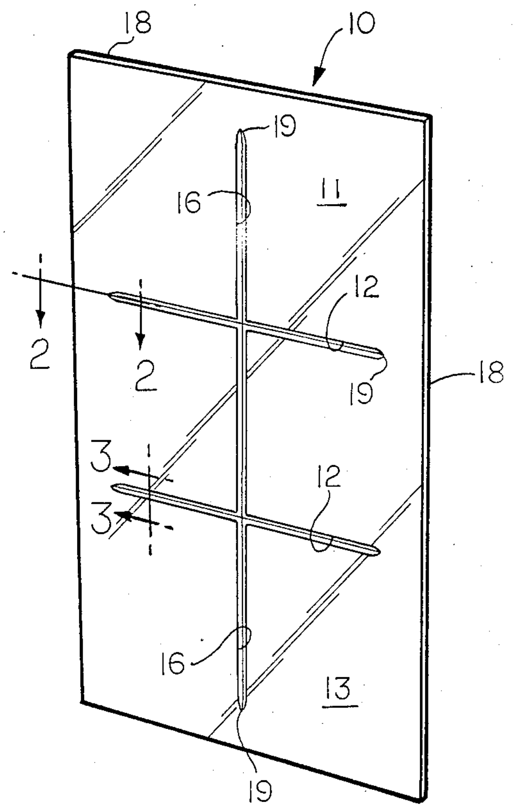
FIG. 1
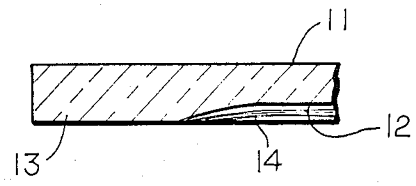
FIG. 2
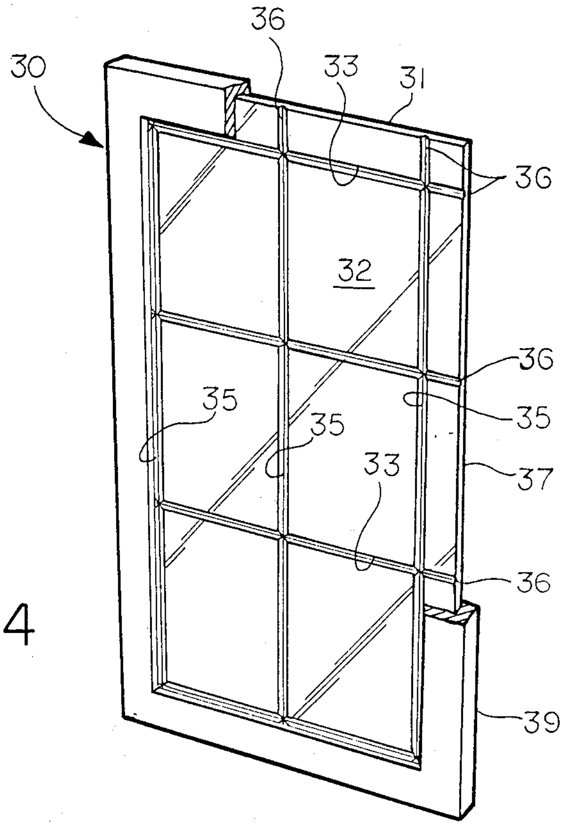
FIG. 4
FIG. 3
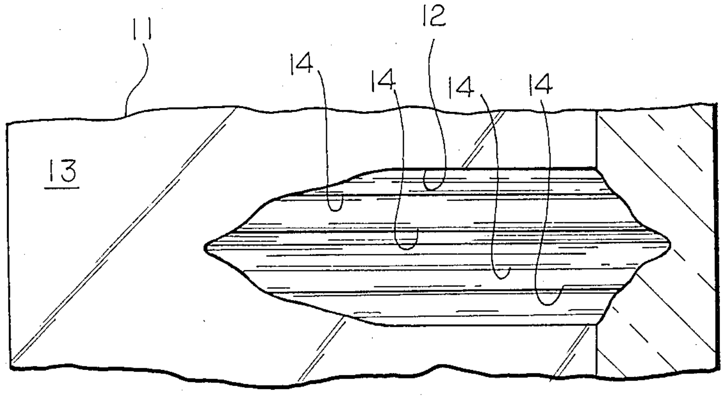

METHOD OF MAKING A BEVELLED GLASS ASSEMBLY

This is a division of co-pending application Ser. No. 075,401 filed on July 20, 1987, now U.S. Pat. No. 4,814,213.

BACKGROUND OF THE INVENTION

Decorative glass assemblies are utilized in many situations including as door lights and as door side glass units. Leaded glass assemblies using multiple pieces of bevelled glass have been used in the past and are very beautiful but very expensive. Many prior art alternative assemblies use a flat glass sheet with bevelled glass bonded to it or wood or wood-like grilles, which are normally positioned on the surface of the glass sheet and secured to the perimeter. These grlles damage easily, are difficult to clean and lack appeal.

SUMMARY OF THE INVENTION

The present invention is directed to a bevelled glass assembly which is tempered. It provides a lightweight and attractive alternative to both leaded glass and prior art grille assemblies.

The bevelled glass assembly, according to the present invention, includes a sheet of annealed glass which has at least one first longitudinally extending groove ground into one surface. The groove comprises an array of paralleled surface striations which enhance optical reflections. At least one longitudinally extending second groove intersects the first groove. The second intersecting groove also includes an array of parallel surface striations. The sheet of annealed glass containing the ground grooves is tempered.

In making the bevelled glass assembly, a sheet of flat glass is annealed and the intersecting grooves are ground within one surface of the glass sheet, the grooves including the arrays of parallel surface striations. The glass is then polished. The tempering is performed after the grinding of the intersecting grooves and the polishing of the glass sheet.

DESCRIPTION OF THE DRAWINGS

FIG. 1 is a perspective view of a bevelled glass assembly, according to the present invention;

FIG. 2 is a fragmentary cross-sectional view, shown on an enlarged scale taken along the line 2—2 of FIG. 1;

FIG. 3 is a fragmentary perspective view taken roughly along the line 3—3 of FIG. 1, shown on an enlarged scale;

FIG. 4 is a fragmentary view of another embodiment of a bevelled glass assembly, according to the present invention, with a portion of the peripheral frame removed;

DESCRIPTION OF THE PREFERRED EMBODIMENTS

Figure 6:
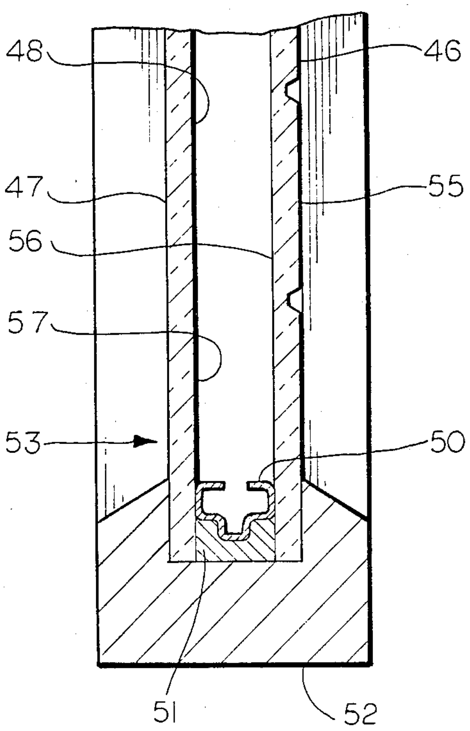
FIG. 6 is a fragmentary cross-sectional view of another embodiment of the present invention showing a double pane insulated bevelled glass assembly.

A bevelled glass assembly, according to the present invention, is generally indicated in FIG. 1 by the reference number 10. The bevelled glass assembly 10 comprises a sheet of annealed glass 11. Preferably the glass sheet 11 is flat plate glass manufactured by a float glass process. The glass sheet 11 preferably has a relatively low lead content of less than 15% lead, by weight. After its initial manufacture, the flat plate glass is annealed. It is found that a glass thickness of between 0.125 inch and 0.250 inch is preferable for the bevelled glass assemblies 10, when they are utilized in connection with residential or commercial door or window applications.

A first set of longitudinally extending grooves 12 are ground into a surface 13. Referring to FIG. 3, the grooves 12 comprise an array of parallel surface striations 14. The parallel surface striations 14 enhance optical reflections giving pleasing aesthetics to the assembly 10.

Figure 5:
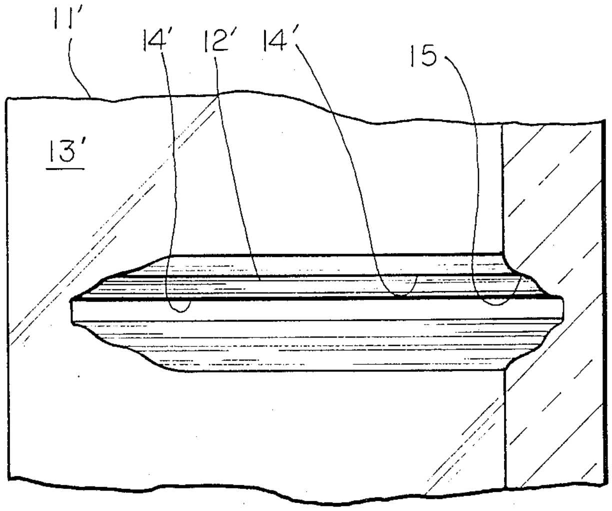
FIG. 5 is a fragmentary perspective view, similar to FIG. 3, and showing a bevel groove having a generally trapezoidal cross section.

In the FIG. 1 embodiment, the grooves 12 are ground to a depth of 0.062 inch on a glass sheet having a thickness of 0.188 inch. The width of the groove 12 is 0.375 inch. The grooves can be V-shaped, curved, trapezoidal or some other cross-sectional shape. Referring to FIG. 5, a groove 15 has a trapezoid cross section.

Referring to FIG. 1, at least one second longitudinal groove 16 intersects the first set of grooves 12. In the FIG. 1 embodiment, the grooves 12 and 16 are perpendicular, however, intersections forming nonperpendicular relationships or diamond shape relationships are also within the scope of the present invention.

The second intersecting longitudinally extending groove 16 also is comprised of an array of parallel surface stiations and has a depth and width complementary with the depth and width of the grooves 12, recited above.

After the longitudinally extending grooves 12 and 16 are ground, the glass sheet 11 is polished and tempered.

Referring to FIG. 1, the glass sheet 11 has a peripheral edge 18. The edge corners may be radiused or ground to aid the tempering process. Ends 19 of the grooves 12 and 16 are spaced from the peripheral edge 18. In the FIG. 1 embodiment, the ends 19 are 0.50 inch from the peripheral edge 18.

A second embodiment of a bevelled glass assembly, according to the present invention, is indicated in FIG. 4 by the reference number 30. The bevelled glass assembly 30 includes a sheet of annealed glass 31 having a surface 32. A first set of longitudinally extending grooves 33 are ground in the surface 32 of the sheet of annealed glass 31. Each of the longitudinally extending grooves 33 comprises an array of parallel surface striations. An intersecting second set of grooves 35 are ground in the surface 32 in a perpendicular relationship to the first set of grooves 33. The grooves 33 and 35 include ends 36 which are located adjacent a peripheral edge 37 of the glass sheet 31.

In the embodiment shown in FIG. 4, the bevelled glass assembly 30 includes a peripheral frame 39 which surrounds the peripheral edge 37 of the glass sheet 31. Perferably, the peripheral frame 39 extends inwardly past the ends 36 of the grooves 33 and 35. The frame 39 may be constructed of several materials, including woods, plastic resins having a wood-like appearance and metals.

After the grooves 33 and 35 are ground into the surface 32 of the glass sheet 31, the sheet 31 is polished and the glass tempered prior to installation of the peripheral frame 39.

Another embodiment of the invention is shown in FIG. 6. A bevelled glass sheet 46, similar to the bevelled glass sheet 11, shown in FIG. 1, is spaced from an unbevelled sheet of flat glass 47 forming an air space 48.

The sheets 46 and 47 are held apart by a spacer 50. Sealing material 51 is placed between the sheets 46 and 47, adjacent the spacer 50. The sheets 46 and 47 are received by a peripheral frame 52 to form an insulated glass assembly 53.

It has been found that an observer looking through the bevel on a first surface 55 of the assembly 53 perceived an unexpected enhanced image through the second surface 56 onto the third surface 57. Therefore, the assembly 53 has excellent optical appeal. The placement of the bevel grooves on the inside or second surface 56 of the sheet 47 does not substantially change the visual effect. However, it has been found that the feel of the groove when touched enhances the appeal of the assembly 53.

It has been found that the bevelled glass assemblies 10, 30 and 53 constructed according to the present invention, provide a lightweight and lower cost alternative to, for example, prior art leaded glass assemblies.

What I claim:

1. A method of making a bevelled glass assembly comprising the steps of: annealing a sheet of flat glass having opposed surfaces, grinding at least one first longitudinally extending groove within one surface of the glass sheet, said groove comprising an array of parallel surface striations, grinding at least one second longtudinally extending groove intersecting said first groove, said second groove comprising an array of parallel surface striations, and tempering said sheet of glass already containing said first and second intersecting grooves.

2. A method according to claim 1, including polishing the surface after grinding the grooves.

3. A method according to claim 2, including surrounding the sheet of flat glass with a frame.

4. A method according to claim 3, including covering the ends of the grooves with the frame.

* * * * *